United States Patent

Kawasaki

[11] Patent Number: 5,603,275
[45] Date of Patent: Feb. 18, 1997

[54] DEVICE FOR FORMING A LOOP-LIKE ANCHOR MEMBER ON A TRIM COVER ASSEMBLY

[75] Inventor: Kiyoshi Kawasaki, Akishima, Japan

[73] Assignee: Tachi-S Co., Ltd., Tokyo, Japan

[21] Appl. No.: 619,082

[22] Filed: Mar. 21, 1996

[51] Int. Cl.⁶ .......................... D05B 27/10; D05B 35/06; D05B 73/04
[52] U.S. Cl. ............... 112/470.27; 112/152; 112/470.33; 112/260; 112/322
[58] Field of Search ..................... 112/470.33, 470.27, 112/152, 324, 260, 322, 47, 50, 62, 63, 470.26, 147, 475.06; 277/218.4; 29/91

[56] References Cited

U.S. PATENT DOCUMENTS

| | | | |
|---|---|---|---|
| 2,313,261 | 3/1943 | Podgorny | 112/152 |
| 2,359,047 | 9/1944 | Mitchell | 112/470.27 X |
| 2,427,467 | 9/1947 | Loiselle | 112/324 |
| 2,738,835 | 3/1956 | Eames | 297/218.4 X |

FOREIGN PATENT DOCUMENTS

| | | |
|---|---|---|
| 54-68354 | 6/1979 | Japan . |
| 57-183808 | 11/1982 | Japan . |
| 6047182 | 2/1994 | Japan ..................... 112/152 |
| 677765 | 8/1952 | United Kingdom .................... 112/152 |
| 978872 | 12/1964 | United Kingdom . |

*Primary Examiner*—Ismael Izaguirre
*Attorney, Agent, or Firm*—Browdy and Neimark

[57] ABSTRACT

A device for automatically forming a loop-like anchor member on a trim cover assembly. The device includes a recessed groove arranged between a slit formed in a table of sewing machine and a movable feed member of sewing machine, a guide duct member extending through the slit from below the table up into the recessed groove, and a feed control device provided in an anchor material supplying/folding mechanism disposed below the table. An folded-over form of anchor member supplied via the guide duct member from the anchor material supplying/folding mechanism is fed and stopped by the feed control device to such degree that the forward extremity of the folded-over form of anchor member is moved in the recessed groove and positioned within the operative feeding range of the movable feed member of sewing machine. Hence, a trim cover assembly can be directly placed on the table and automatically sewn with the folded-over form of anchor member, without acute contact or dislocation therebetween, so as to precisely form a loop-like anchor member on the trim cover assembly.

18 Claims, 4 Drawing Sheets

DEVICE FOR FORMING A LOOP-LIKE ANCHOR MEMBER ON A TRIM COVER ASSEMBLY

BACKGROUND OF INVENTION

1. Field of the Invention

The present invention relates to a device for automatically forming a loop-like anchor member on a trim cover assembly for use in an automotive seat, the loop-like anchor member being to be anchored to an insert wire embedded in a cushion member of the seat to thereby secure the trim cover assembly on the cushion member.

2. Description of Prior Art

There has been known such anchoring type of trim cover assembly (TR) having a loop-like anchor cloth member dependent from the reverse side thereof, as can be seen in FIG. 1. In general, the anchor cloth member is of a loop-like strip configuration having a through-bore defined therein, just similar to a loop-like anchor member (C') having a through-bore (l) which is used in the present invention and shown in FIGS. 1 and 2.

The ordinary anchor cloth member of this type is sewn, at the two longitudinal ends thereof, to the reverse side of the trim cover assembly (TR), and used for anchoring the trim cover assembly (TR) to an insert wire (D) embedded in a foam cushion member (not shown) to thereby positively secure the trim cover assembly (TR) on the cushion member in close contact thereupon, in assembling an automotive seat (not shown). The insert wire (D) is inserted in the through-bore of anchor cloth member to anchor the trim cover assembly (TR) to the not-shown cushion member.

Normally, although not shown as a prior art in the drawings, an original flat tape of cloth material is provided in a rolled webbing state within a rotary storage device disposed under a table of a sewing machine, and such original tape of cloth material is drawn out from the rotary storage device and inserted into a folding device, so that the cloth material is folded by the folding device along its central longitudinal line and doubled over into a preliminary from of anchor cloth member. Then, the thus-formed preliminary anchor cloth member is pulled and set at a predetermined point where the free forward extremity of anchor cloth member is located in the vicinity of a movable feed member (i.e. feed dog) of sewing machine. At this point, a pair of juxtaposed separate trim cover assembly sections (A)(B) (see FIG. 1 for instance) are placed on the table of sewing machine, with their respective ends (A1)(B1) being juxtaposed on and aligned with the two longitudinal ends of anchor cloth member, after which, both of the trim cover assembly sections and anchor cloth member are sewn together at and along their respective ends by the sewing machine so as to form a loop-like anchor cloth member at the reverse side of resultant rim cover assembly (TR) in a manner dependent therefrom, as can be understood from FIG. 1.

However, during this sewing operation, such problem has arisen that the forward extremity of folded anchor cloth member acutely contacts the reverse side of lower one of the trim cover assembly sections when bringing the anchor cloth member to a position beneath that lower one of trim cover assembly sections, resulting thus in the dislocation of a given sewing position of the anchor cloth member relative to the trim cover assembly sections. Further, in the case of an automated sewing device of this sort having a guide plate movable on the table of sewing machine, the movement of the guide plate, on which the trim cover assembly sections are placed, creates such problem that one end of the guide plate contacts and upturns the forward extremity of preliminary anchor cloth member in a direction reversing its feeding direction to the sewing machine, with the result that the preliminary anchor cloth member may not be sewn precisely with the trim cover assembly sections along a given sewing line therebetween. Those drawbacks are also due to the non-rigid, easily bendable nature inherit in the cloth material used in the conventional anchor cloth member. As a consequence of the foregoing various defective factors, there has been no other way than to set a length of the folded preliminary anchor cloth member greater than that of the two trim cover assembly sections, and juxtapose them together such that the forward end portion of the anchor cloth member is projected a proper distance from the forward extremities of two trim cover assembly sections, in order to prevent the above-discussed contact and upturning problems of preliminary anchor cloth member. But, even in that case, after sewing the anchor cloth member to the trim cover assembly sections, it is necessary to cut off the projected end portion of resultant loop-like anchor cloth member from a resultant trim cover assembly, which turns out troublesome on the worker's part and undesirably waste in the costs involved.

SUMMARY OF THE INVENTION

In view of the above-stated drawbacks, it is a primary purpose of the present invention to provide an improved device for forming an anchor member on a trim cover assembly, which permits for precisely feeding the anchor member together with the trim cover assembly towards a sewing area of sewing machine, without dislocation or upturning of the anchor emmber relative to the trim cover assembly, and then sewing the former to the latter at a predetermined sewing line.

In order to achieve such purpose, in accordance with the present invention, there is basically provided a sewing device which comprises:

- a recessed groove means which is arranged on a table such as to be disposed between a slit and a feeding means associated with a sewing machine;
- a guide means provided between the recessed groove means and a supplying/folding mechanism disposed below the table, which guide means has one end portion extending through the slit towards the recessed groove; and
- a feed control means provided in the supplying/ folding mechanism, the feed control means being operable and controllable to feed and stop a folded-over form of anchor member, such that a forward end of the folded-over form of anchor member is positioned within an operative feeding range of the feeding means, wherein when the trim cover assembly is placed on the table such as to overlie the guide means, the forward end of the doubled-over form of anchor member is fed through the guide means and stopped in the operative feeding range of the feeding means by operation of the feed control means, and the doubled-over form of anchor member is sewn to the trim cover assembly, thereby forming a loop-like anchor member on the trim cover assembly.

Other aspect of the invention is that, in the same structure and mechanism of automated sewing device as described above, the folded-over form of anchor emmber may be sewn to two trim cover assembly sections so as to form a resulting loop-like anchor member depending from one concurrently resulting trim cover assembly.

The recessed groove means may comprise a recessed groove which is so formed in an upper surface of the table as to have a depth greater than a thickness of the folded-over form of anchor member and a width greater than that of the same anchor member. Preferably, the recessed groove may include a region in which the forward end portion of guide means is so accommodated as to avoid projection thereof above the upper surface of table.

Preferably, the forward end portion of said guide means may be formed to extend horizontally from the slit into the recessed groove.

As another aspect of the invention, the sewing area in this device may include a sewing base plate in which the feeding means is provided, and such sewing base plate may include a part of the recessed guide means defined therein in proximity of the feeding means.

In accordance with the present invention, the anchor member used is made of a material having a certain rigidity yet elastic property such as to resiliently maintain stable the longitudinal shape thereof when it is fed through the guide means towards the feeding means. Preferably, for instance, the material may be a synthetic resin fabric material having such certain rigidity yet elastic property.

Other features and advantages of the present invention will become apparent from reading of the descriptions hereinafter, with reference to the annexed drawings.

DETAILED DESCRIPTION OF PREFERRED EMBODIMENTS OF THE INVENTION

Referring to FIGS. 1 through 7, there is illustrated a preferred mode of automated sewing device for forming a loop-like anchor member (C') on a trim cover assembly (TR) or a pair of trim cover assembly sections (A)(B), in accordance with the present invention. In the illustrated embodiments, the trim cover assembly (TR) is to be formed from those two sections (A)(B) together with the anchor member (C').

Figure 4:
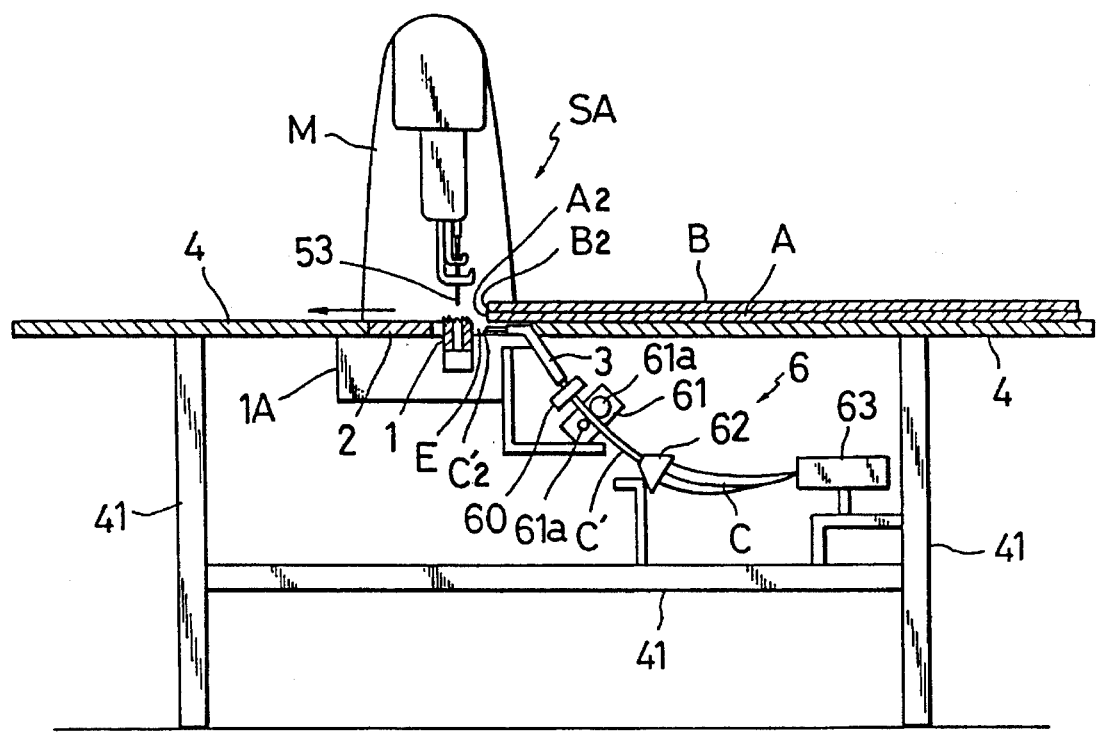
FIG. 4 is a partly broken schematic diagram for generally showing a whole structure of the device in accordance with the present invention, as viewed in elevation from one side.
Figure 5:
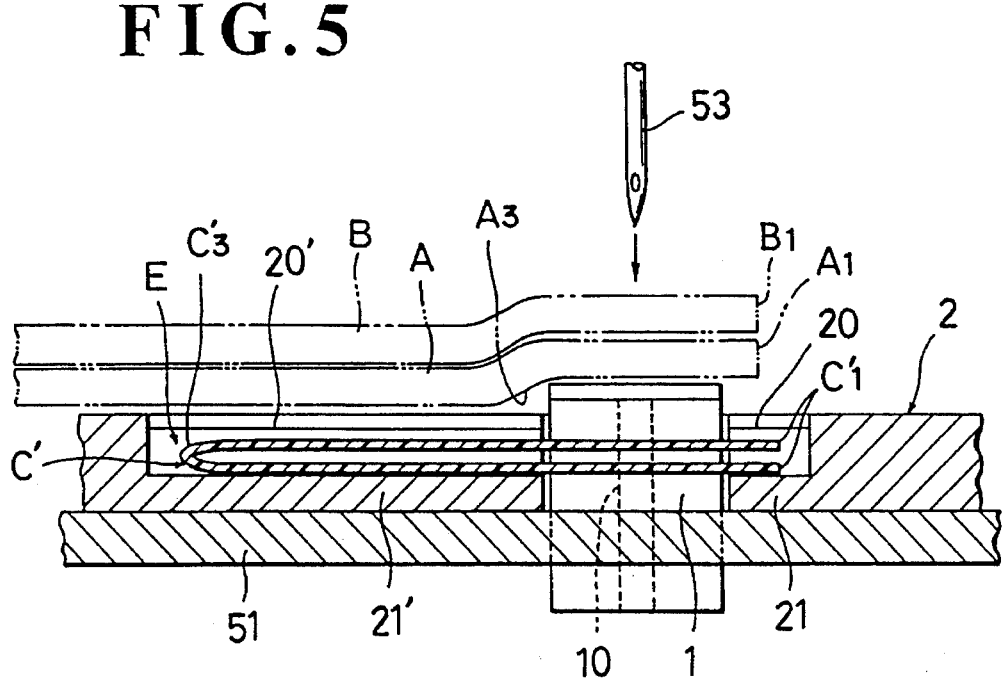
FIG. 5 is a fragmentary sectional view taken along the line V—V in FIG. 3, which indicates that the folded-over form of anchor member and trim cover assembly sections are to be sewn together.

FIG. 4 schematically shows an automated sewing device used in the present invention. In the illustrated sewing device, a sewing machine (M) is mounted on a table (4), and an anchor material supplying/folding mechanism (6) is arranged below the table (4).

Designation (SA) represents a sewing area of the sewing machine (M), wherein, as known in the art, an ordinary feeding/ sewing mechanism is provided, comprising a sewing needle (53), two pressure foot pieces (54)(55) and a feed dog or movable serrated feed member (1).

Figure 2:
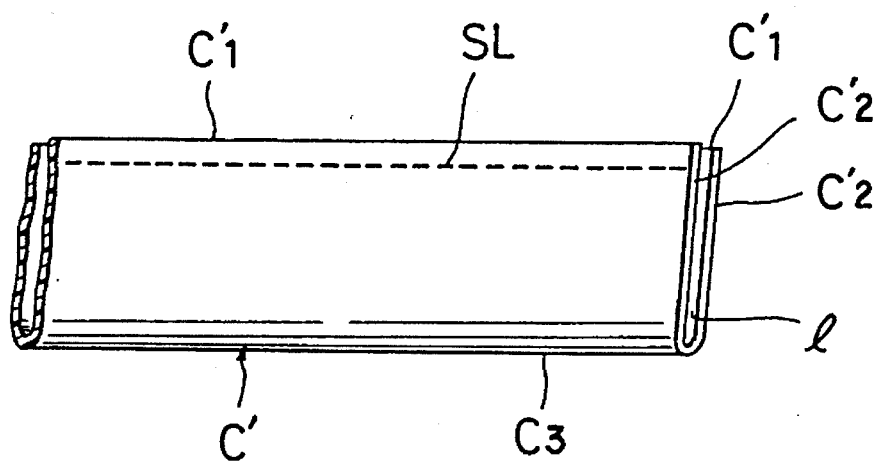
FIG. 2 is a partly broken schematic perspective view of a folded-over form of anchor member.

The anchor material supplying/folding mechanism (6) is basically of a known construction including a rotary supply device (63), a folding guide member (62), and a cutting device (60). Those elements are supported on a base frame (41) on which is fast mounted the table (4) of sewing machine (4). In this respect, specifically stated, as shown in FIG. 4, a long continuous tape of original material designated by (C) is stored in a rolled webbing state within the foregoing rotary supply device (63) and introduced therefrom into the folding guide member (62), through which the flat tape of original anchor member (C) is folded along its central longitudinal line into a doubled-over preliminary form of anchor member (C') as shown in FIG. 2. Hereinafter, the doubled-over preliminary form of anchor member shall be referred to as "preliminary anchor member". In accordance with the present invention, such preliminary anchor member (C') is then introduced into between a pair of rollers (61a)(61a) of a feed control device (61), and further inserted past through the cutting device (60) and a guide duct member (3) so as to project therefrom at a given position in the sewing area (SA) of sewing machine (M) above the table (4).

In accordance with the present invention, the preliminary anchor member (C') per se is formed from a synthetic resin fabric material, such as a nylon fabric material, which has a certain rigidity in comparison with a cloth material, yet a proper elastic property such as to resiliently maintain stable the longitudinal shape thereof while it is being fed and sewn to the trim cover assembly (TR) or two trim cover assembly sections (A)(B) by operations of the feed control device (61), movable serrated feed member (1) and sewing machine (M) which will be described later. This is however not limitative, but any other suitable material may be used for the anchor member (C') insofar as it has such certain rigid yet elastic property within the gist of the present invention.

Figure 3:
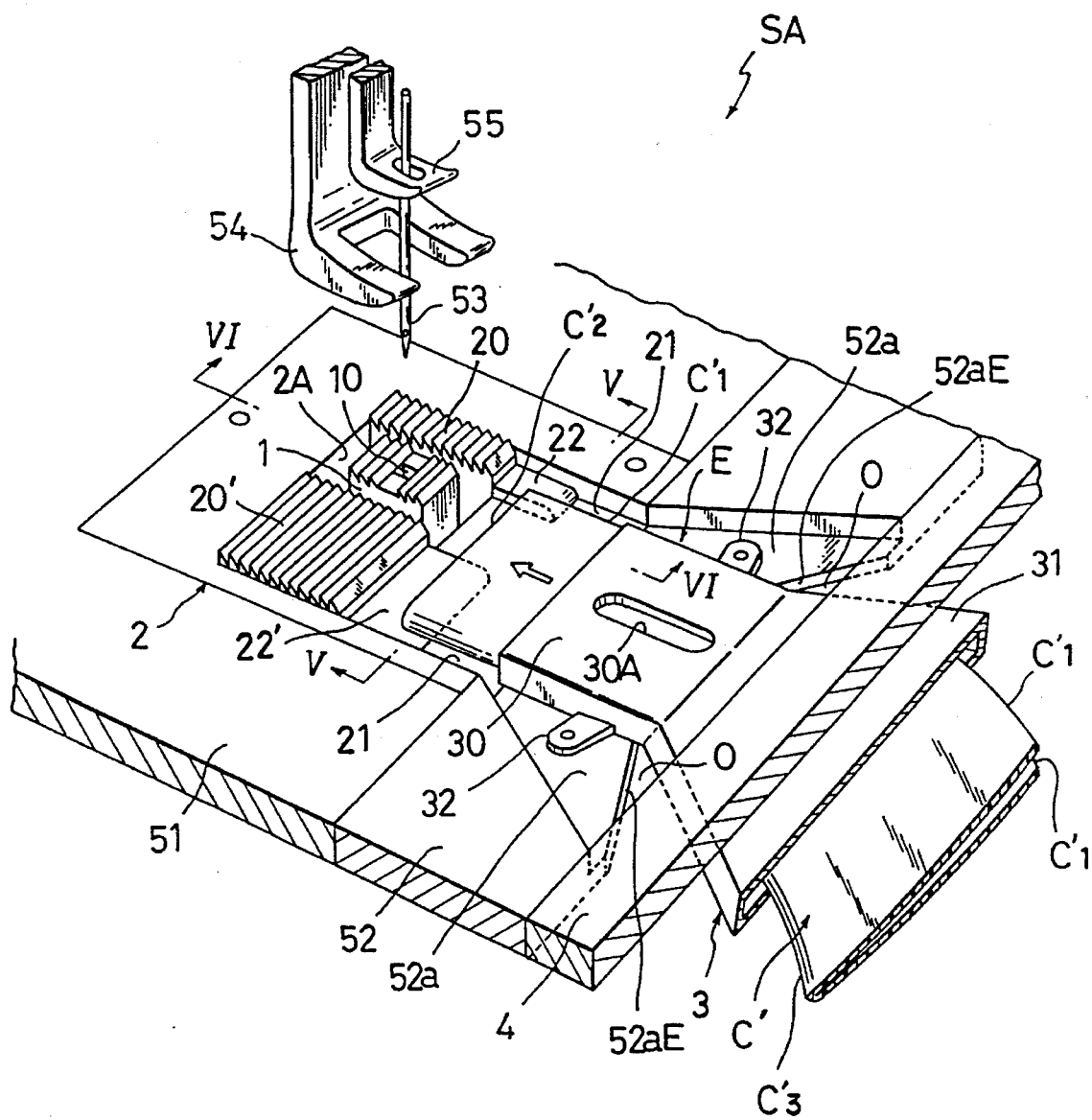
FIG. 3 is a partly broken schematic perspective view of a principal part of a device for forming a loop-like anchor member on a trim cover assembly in accordance with the present invention.

FIG. 3 shows, in detail, the sewing area (SA) of sewing machine (M). This sewing area (SA) is defined in the table (4) of sewing machine (M), such as to be composed of first and second stainless steel plates (51)(52). In accordance with the present invention, a sewing base plate (2) is provided in the first stainless steel plate (51), in which are basically formed a first recessed area (21) of a generally rectangular contour and a generally rectangular through-hole (2A). Designations (20)(20') denote a pair of spaced-apart first and second stationary serrated members, respectively, which are so arranged in the recessed area (21) that they are disposed on the opposite lateral sides of the through-hole (2A). In the through-hole (2A), the movable serrated feed member (1) is so disposed as to be movable in the longitudinal direction thereof for a feeding purpose to be explained later. The movable serrated feed member (1) is formed with a needle passage hole (10) therein, through which, the sewing needle (53) is to be reciprocated vertically for sewing purpose. Movement of that feed member (1) is effected by a known drive mechanism (at (1A) in FIG. 4, but not shown clearly) complete with the sewing machine (M). As can be seen in FIG. 3, the first serrated member (20) is formed narrow, while by contrast, the second serrated member (20') is formed wide, and thus, the through-hole (2A) is dislocated from a central line of the sewing base plate (2), so that the sewing machine (M) positions its sewing needle (53) in a sewing path along a predetermined sewing line (SL) of preliminary anchor member (C') which extends adjacent and alongside the two longitudinal ends (C'1)(C'1) (see FIG. 2).

On the other hand, in the second stainless steel plate (52), a second recessed area (52a) of generally trapezoidal contour is formed in communication with the foregoing generally rectangular first recessed area (21), in a manner diverging therefrom. The second stainless steel plate (52) itself is connected, at one side thereof, to the table (4). As shown in FIG. 3, such second recessed area (52a) of second plate (52) has a generally V-shaped edge (52aE) formed at that one side thereof, whereupon a triangular slit (O) is defined between the second stainless steel plate (52) and table (4). It is important to note that the first and second recessed areas (21)(52a) are formed in a coplanar relation with each other, having the same depth of recession, whereby the two recessed areas (21)(52a) in the aggregate define an anchor member introduction recessed groove (E) in the upper side of sewing area (SA). In that sense, it is to be understood that the first and second recessed areas (21)(52a), respectively, form a rectilinear recessed region and a diverged recessed region in such anchor member introduction recessed groove (E), with a view to smoothly guiding the preliminary anchor member (C') from the guide duct member (3), lest the forward end (C'2) of same anchor member (C') should project from the flat plane of the sewing area (SA). Namely, as in FIG. 3, the guide duct member (3) is inserted through the V-shaped slit (O) from below the table (4), such that the horizontally extending forward end portion (30) of the guide duct member (3) is fixed via its two securing lugs (32)(32) on the flat surface of diverged recessed region (52a) of the anchor member introduction recessed groove (E). It is observed here that the guide duct member (3) is provided with a converged portion (31) which terminates, at one end thereof, in the narrow size of forward end portion (30) thereof, while extending, at another end thereof, slantwise down from that horizontal forward end portion (30) towards the inclined main body of guide duct member (3) disposed below the table (4). This arrangement effectively guides the forward end portion (at C'2) of preliminary anchor member (C') on a horizontal plane from the the inclined state under the table (4), as shown in FIG. 4, along the upper flat surface of table (4) in the direction towards a predetermined point in the proximity of the movable serrated member (1). Also, the narrow forward end portion (30) of guide duct member (3) is so formed to have a guide passage bore slightly greater than the width and thickness of the doubled-over preliminary anchor member (C').

Designation (30A) denotes a hole formed in the upper surface of the forward end portion (30) of guide duct member (3). The hole (30A) provides an access to a part of the preliminary anchor member (C') therethrough when the anchor member (C') is not correctly fed therefrom, so that an operator can insert a pin or needle through the hole (30A) to prick and adjust the exposed part of the anchor member (C') in a proper direction and location for correct feeding towards a given sewing point.

The rectangular recessed region (21) provides a setting position at which the forward extremity (C'2) of preliminary form of anchor member (C') is set to project a certain distance from the forward end portion (30) of guide duct member (3) within the recessed region (21). In particular, a pair of spaced-apart protruded platforms (22)(22') are formed on the flat surface of that recessed region (21) so that the forward extremity (C'2) of anchor member (C') is placed thereon, orienting upwards to a level near to the movable and stationary serrated members (1)(20)(20'), as seen from both FIGS. 3 and 6, in order to facilitate the ease with which the projected anchor member forward extremity (C'2) will ride on the two stationary serrated members (20)(20'). The formation and contour of the two platforms (22)(22') are not limited to the illustrated mode, but they may be altered into one single platform or may each be provided with an upwardly sloped upper surface to more facilitate the smooth riding of the anchor member extremity (C'2) on the stationary serrated members (20) (20'), for instance.

Figure 6:
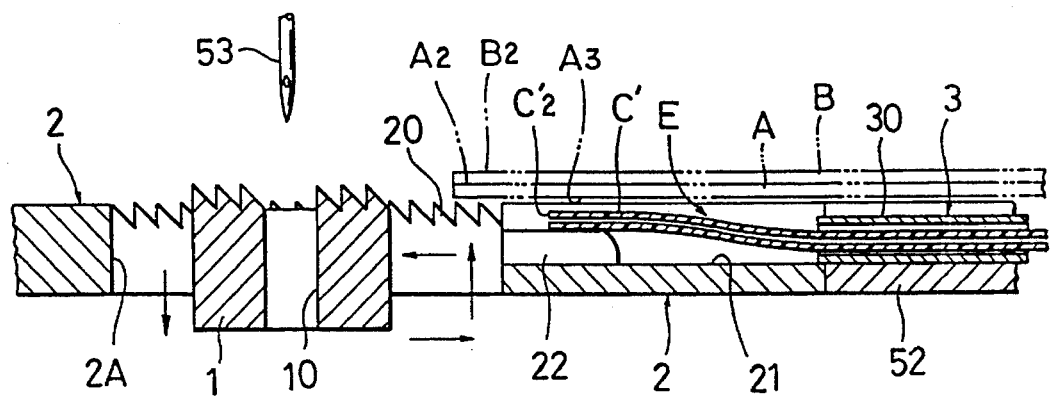
FIG. 6 is a fragmentary sectional view taken along the line VI—VI in FIG. 3, which indicates that the folded-over form of anchor member is set and two trim cover assembly sections are placed thereupon.
Figure 7:
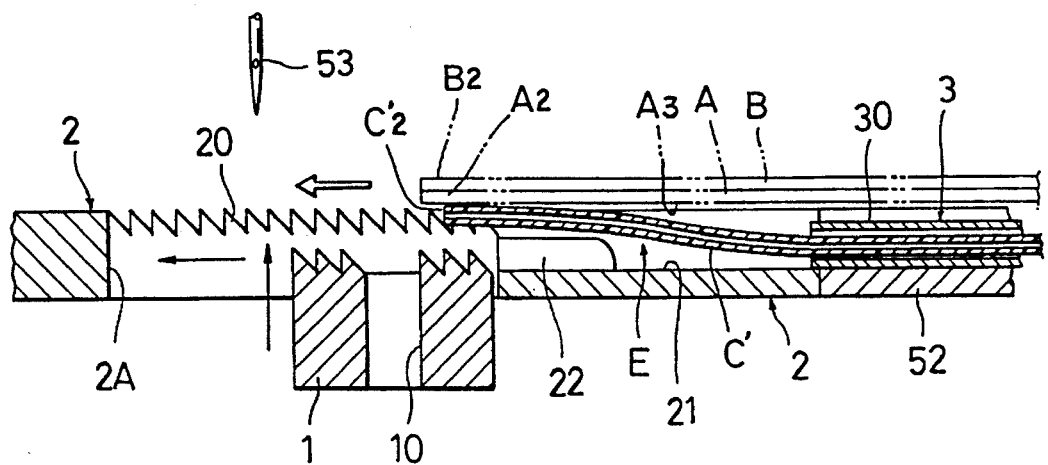
FIG. 7 is a fragmentary sectional view corresponding to FIG. 6, which indicates that the folded-over form of anchor member is fed into between serrated members of sewing machine and two trim cover assembly sections.

In operation, at first, the forward extremity (C'2) of preliminary anchor member (C') is set within the rectangular recessed region (21) of anchor member introduction recessed groove (E) such as to project from the forward end portion (30) of guide duct member (3) and rest on the two protruded platforms (22)(22'), as best shown in FIG. 6. Secondly, the two separate trim cover assembly sections (A)(B) are juxtaposed with each other, with their respective forward ends (A2)(B2) and longitudinal ends (A1)(B1) being aligned neatly together, and then placed on the table (4), such that the forward ends (A2)(B2) of trim cover assembly sections (A)(B) lie on a part of two stationary serrated members (20)(20') in front of the sewing needle (53), as indicated in FIG. 6, while at the same time, the longitudinal ends (A1)(B1) of same trim cover assembly sections (A)(B) are aligned with the longitudinal ends (C'1)(C'1) of preliminary anchor member (C'). It is therefore seen that the forward extremity (C'2) of anchor member (C') underlies the two trim cover assemlby sections (A)(B) in a general parallel relation therewith, within the depth of recessed region (21), whereby there is no acute contact between the those two layers (C') and (A, B). Next, by operation of the feeding device (61), the preliminary anchor member (C') is caused to advance in a direction towards the sewing needle (53) and inserted into between the trim cover assembly sections (A)(B) and the stationary serrated members (20)(20'), as understandable from FIG. 7. At this stage, in accordance with the present invention, the feed control device (61) is programmed and controlled to drive its two rollers (61a)(61a) so as to feed and stop the preliminary anchor member (C') to the degree that the forward extremity (C'2) of same anchor member (C') rides on the respective end portions of the stationary serrated members (20)(20') each facing towards the forward end portion (30) of guide duct member (3), as can be seen in FIG. 7 in conjunction with FIG. 3. With this operation of feed control device (61), as also understandable from FIG. 7, the forward extremity (C'2) of preliminary anchor member (C') is automatically fed and stopped at a position corresponding to a point bridging partway over the through-hole (2A) of sewing base plate (2), within the operative feeding range of movable feed serrated member (1). In that feeding area, as shown, the movable serrated feed member (1) is firstly set at a side adjacent to the two protruded platforms (22)(22') and is to be raised vertically for frictional contact with the exposed part of preliminary anchor member forward extremity (C'2) which is exposed from the through-hole (2A).

Although not shown, a movable guide plate is provided on the table (4), on which movable guide plate, the juxtaposed two trim cover assembly sections (A)(B) are secured, and it is arranged such that the movable guide plate will be automatically moved by a cylinder drive mechanism to carry the trim cover assembly sections (A)(B) towards the sewing needle (53) of sewing machine (M) in response to the feed control device (61) having actuated to set the preliminary anchor member forward extremity (C') within the operative feeding range of movable serrated feed member (1). With this transfer of trim cover assembly sections (A)(B) plus the feeding motion (see the arrows in FIG. 6) of movable serrated feed member (1), the preliminary anchor member (C') is fed together with the trim cover assembly sections (A)(B) for sewing by the sewing machine (M) as understandable from FIGS. 7 and 5.

In the course of sewing of the preliminary anchor member (C') to the two trim cover assembly sections (A)(B), the cutting device (60) is automatically actuated to cut off the tape of preliminary anchor member (C') in a predetermined length relative to the length of trim cover assembly sections (A)(B).

Figure 1:
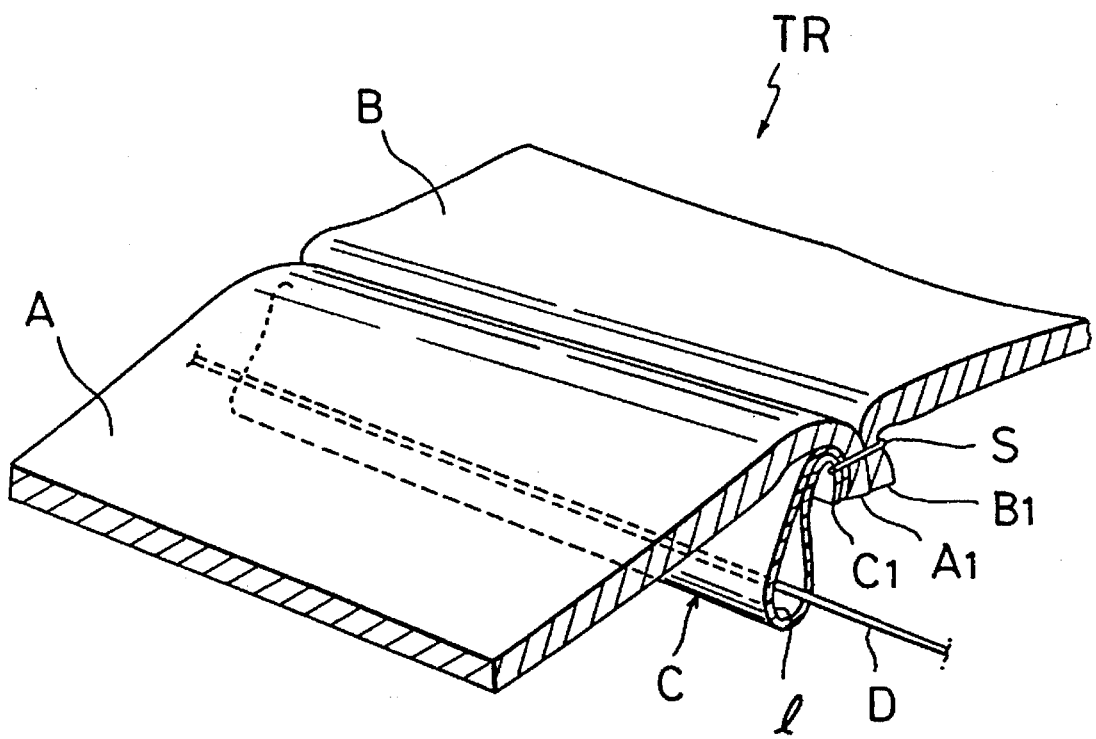
FIG. 1 is a partly broken schematic perspective view of a trim cover assembly with a loop-like anchor member depending therefrom.

At the completion of sewing, there is produced such resultant loop-like anchor member (C') as shown in FIG. 1, which depends from the reverse side of concurrently resulting main trim cover assembly (TR). Also, the movable guide member (not shown) is automatically returned to a home position where another two trim cover assembly sections are to be secured thereon, and another supply of preliminary anchor member (C') is fed and set by the supplying/folding mechanism (6) toward the rectangular recessed region (21) of anchor member introduction recessed groove (E), as likewise in FIG. 3, for further continued same feeding and sewing operations as described above.

By being constructed above, the present invention is therefore given the following advantages: (i) An anchor member introduction recessed groove (E) is formed in the sewing area (SA) of sewing machine (M) to assist in guiding the forward extremity (C'2) of preliminary anchor member (C') to a predetermined point in proximity of the sewing needle (54) and movable and stationary serrated members (1)(20)(20'), without any acute contact of such preliminary anchor member forward extremity (C'2) with the trim cover assembly sections (A)(B). Thus, the preliminary anchor member (C') is prevented against undesired dislocation and upturning with respect to the trim cover assembly sections (A)(B) during feeding and sewing operations of sewing machine (M). (ii) The guide duct member (3) is therefore provided with the horizontally extending forward end portion (30) from the donwardly extending remnant (31) below the table (4), so that the preliminary anchor member (C') is assuredly introduced in a horizontal flat state into the recessed groove (E), thereby serving to prevent such acute contact of forward extremity (C'2) of anchor member (C'). (iii) The preliminary anchor member (C') per se is made of a material having a certain rigidity yet elastic property in comparison with the hitherto cloth material used, such as a synthetic resin fabric material. This insures to resiliently maintain stable the longitudinal shape of the preliminary anchor member (C') while it is being fed in the guide duct member (3) and fed therefrom into between the trim cover assembly layer (A, B) and two serrated members (1)(20, 20'), contributing thus to avoiding the dislocation and upturning problems found in the prior art. (iv) The feed control device (61) is provided to automatically feed and stop the preliminary anchor member (C') to the degree that the forward extremity (C'2) of preliminary anchor member (C') is positioned within the operative feeding range of movable feed member (1), as seen in FIG. 7. thereby permitting the preliminary anchor member (C') to be readily caught by the feed member (1) without need for a worker to see it in his or her eyes. This means that before setting the preliminary anchor member (C') to the feeding range of movable feed member (1), the two trim cover assembly sections (A)(B) may be firstly placed on the table (4), with their forward end portions (A2)(B2) resting on both sewing base plate (2) and apart of serrated members (20)(20'), and thereafter, the forward extremity (C'2) of preliminary anchor member (C') be fed under a controlled operation of the feed control device (61) such as to advance a predetermined distance, sliding into between the serrated members (20)(20') and two trim cover assembly sections (A)(B), as indicated in FIGS. 6 and 7, and stopping at a predetermined point within the operative feeding range of movable serrated member (1). This does not require any attention to be paid from a worker, and not cause any acute contact between those two layers (C') and (A, B) neither.

Although not shown, all the constituent elements and devices described above are electrically connected with a computerized control unit and automatically controlled thereby to perform their respective actions so as to feed and sew together both preliminary anchor member (C') and two trim cover assembly sections (A)(B), thereby automatically producing a resultant loop-like anchor member (C') depending from a concurrently resulting main trim cover assembly (TR).

While having described the present invention as above, it should be understood that the invention is not limited to the illustrated embodiments, but any other modifications, replacements and additions may be applied thereto structurally and mechanically without departing from the scopes of the appended claims.

What is claimed is:

1. A device for automatically forming a loop-like anchor member on a trim cover assembly, which includes a supplying/folding mechanism disposed below a table of a sewing machine, said supplying/folding mechanism being operable to supply and fold an original tape of anchor member along the central longitudinal line thereof into a folded-over form of anchor member, and a slit which is formed in said table in vicinity of a sewing area on said table where the sewing machine and a feeding means associated with said sewing machine are provided, wherein, through said slit, said folded-over form of anchor member is fed from below said table by operation of said supplying/folding mechanism towards said sewing area and then sewn to said trim cover assembly by said sewing machine and feeding means so as to form the loop-like anchor member dependent from said trim cover assembly, said device comprising:

a recessed groove means which is arranged on said table such as to be disposed between said slit and said feeding means of said sewing machine;

a guide means provided between said recessed groove means and said supplying/folding mechanism, said guide means having one end portion extending through said slit towards said recessed groove; and a feed control means provided in said supplying/folding mechanism, said feed control means being operable and controllable to feed and stop said folded-over form of anchor member, such that a forward end of said folded-over form of anchor member is positioned within an operative feeding range of said feeding means associated with said sewing machine, wherein when said trim cover assembly is placed on said table such as to overlie said guide means, said forward end of said doubled-over form of anchor member is fed through said guide means and stopped in said operative feeding range of said feeding means by operation of said feed control means, and said doubled-over form of anchor member is sewn to said trim cover assembly, thereby forming the loop-like anchor member on said trim cover assembly.

2. The device as defined in claim 1, wherein said recessed groove means comprises a recessed groove which is so formed in an upper surface of said table as to have a depth greater than a thickness of said folded-over form of anchor member and a width greater than that of the same anchor member.

3. The device as defined in claim 2, wherein said recessed groove includes a region in which said forward end portion of said guide means is so accommodated as to avoid projection thereof above the upper surface of said table.

4. The device as defined in claim, 1, wherein said forward end portion of said guide means is formed to extend horizontally from said slit into said recessed groove means.

5. The device as defined in claim 1, wherein said recessed groove means includes a protruded platform formed therein in proximity of said feeding means.

6. The device as defined in claim 1, wherein said sewing area includes a sewing base plate in which said feeding means is provided, and wherein said sewing base plate includes a part of said recessed guide means defined therein in proximity of said feeding means.

7. The device as defined in claim 1, wherein said feeding means comprises a serrated feed member movable in conjunction with operation of said sewing machine.

8. The device according to claim 7, wherein said material is a synthetic resin fabric material having said certain rigidity yet elastic property.

9. The device as defined in claim 1, wherein said anchor member is made of a material having a certain rigidity yet elastic property such as to resiliently maintain stable the longitudinal shape thereof when it is fed through said guide means towards said feeding means.

10. The device as defined in claim 1, wherein said forward end portion of said guide means includes a flat upper wall generally flush with an upper surface of said table on which said trim cover assembly is to be placed.

11. The device as defined in claim 1, wherein said guide means comprises a guide duct member having said forward end portion, and wherein said forward end portion of said guide duct member has a through-bore which is slightly greater than width and thickness of said doubled-over form of anchor member, and further said forward end portion of said guide duct member extends from said slit on a plane horizontal with said table on which said trim cover assembly is to be placed, and lies within said recessed groove in vicinity of said feeding means.

12. The device according to claim 11, wherein said guide duct member includes a flat upper wall flush with an upper surface of said table on which said trim cover assembly is to be placed.

13. A device for automatically forming a loop-like anchor member on a trim cover assembly, in which two separate trim cover assembly sections are automatically sewn with each other to form the trim cover assembly together with the loop-like anchor member, and the device includes a supplying/folding mechanism disposed below a table of sewing machine, said supplying/folding mechanism being to supply and fold an original tape of anchor member along the the central longitudinal line thereof into a folded-over form of anchor member, and a slit which is formed in said table in vicinity of a sewing area on said table where the sewing machine and a feeding means associated with said sewing machine are provided, wherein, through said slit, said folded-over form of anchor member is fed from below said table by operation of said supplying/folding mechanism towards said sewing area and then sewn to said two trim cover assembly sections by said sewing machine and feeding means so as to form the loop-like anchor member on the trim cover assembly, said device comprising:
a recessed groove means which is arranged on said table such as to be disposed between said slit and said feeding means of said sewing machine;
a guide means provided between said recessed groove means and said supplying/folding mechanism, said guide means having one end portion extending through said slit towards said recessed groove; and
a feed control means provided in said supplying/folding mechanism, said feed control means being operable and controllable to feed and stop said folded-over form of anchor member, such that a forward end of said folded-over form of anchor member is positioned within an operative feeding range of said feeding means associated with said sewing machine;
wherein when said two trim cover assembly sections are juxtaposed together and placed on said table such as to overlie said guide means, said forward end of said doubled-over form of anchor member is fed through said guide means and stopped in said operative feeding range of said feeding means by operation of said feed control means, and said doubled-over form of anchor member is sewn to the thus-juxtaposed two trim cover assembly sections, thereby not only forming said trim cover assembly but also forming said loop-like anchor member dependent from said trim cover assembly.

14. The device as defined in claim 13, wherein said forward end portion of said guide means includes a flat upper wall generally flush with an upper surface of said table on which said two trim cover assembly sections are to be placed.

15. The device as defined in claim 13, wherein said guide means comprises a guide duct member having said forward end portion, and wherein said forward end portion of said guide duct member has a through-bore which is slightly greater than width and thickness of said doubled-over form of anchor member, and further said forward end portion of said guide duct member extends from said slit on a plane horizontal with an upper surface of said table on which said two trim cover assembly sections are to be placed, and lies within said recessed groove in vicinity of said feeding means.

16. The device according to claim 15, wherein said guide duct member includes a flat upper wall flush with the upper surface of said table on which said two trim cover assembly sections are to be placed.

17. The device as defined in claim 13, wherein said anchor member is made of a material having a certain rigidity yet elastic property such as to resiliently maintain stable the longitudinal shape thereof when it is fed through said guide means towards said feeding means.

18. The device according to claim 17, wherein said material is a synthetic resin fabric material having said certain rigidity yet elastic property.

* * * * *